United States Patent
Suga

(10) Patent No.: US 6,297,908 B1
(45) Date of Patent: Oct. 2, 2001

(54) DIRECTIONAL LIGHT-DIFFUSING FILM, A METHOD OF MANUFACTURING SAME, AND A DISPLAY DEVICE THAT USES SAME

(75) Inventor: Taiji Suga, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 09/324,139

(22) Filed: Jun. 2, 1999

(30) Foreign Application Priority Data

Jun. 5, 1998 (JP) .................................................. 10-157940

(51) Int. Cl.$^7$ ........................... G02B 5/02; G02F 1/1335; F21V 7/04
(52) U.S. Cl. ............................. 359/599; 359/900; 349/64; 362/31
(58) Field of Search .............................. 359/28, 599, 707, 359/900; 362/31, 333; 349/61–66, 112, 59; 264/1.24, 2.2, 1.29, 1.34, 1.7, 2.1, 3.2, 3.3; 428/463, 195

(56) References Cited

U.S. PATENT DOCUMENTS

| | | | |
|---|---|---|---|
| 2,749,794 | * | 6/1956 | O'Leary ................................ 359/599 |
| 3,694,246 | * | 9/1972 | Purcell et al. ...................... 359/599 |
| 3,754,814 | * | 8/1973 | Leith .................................... 359/599 |
| 3,832,541 | * | 8/1974 | Bassett et al. ...................... 359/599 |
| 4,310,219 | * | 1/1982 | Jaccard ................................ 359/599 |
| 5,198,922 | * | 3/1993 | Chahroudi ........................... 359/599 |
| 5,396,350 | * | 3/1995 | Beeson et al. ........................ 349/65 |
| 5,598,280 | * | 1/1997 | Nishio et al. ......................... 349/62 |
| 5,629,784 | * | 5/1997 | Abileah et al. ..................... 359/599 |
| 5,666,174 | * | 9/1997 | Cupolo, III ........................... 349/64 |
| 5,940,215 | * | 8/1999 | Rudisill et al. .................... 359/599 |

FOREIGN PATENT DOCUMENTS 5-88168-A * 4/1993 (JP) ...................................... 359/599

* cited by examiner

Primary Examiner—Thong Nguyen
(74) Attorney, Agent, or Firm—Oliff & Berridge, PLC

(57) ABSTRACT

A directional light-diffusing film is formed by minute light-transmitting regions which pass light and minute light-diffusing regions which diffuse light, these light-transmitting regions and light-diffusing regions being arranged in an alternating pattern on a surface of a transparent base material film in either the direction of one dimension or the direction of two dimensions. Light which passes through the light-diffusing regions is diffused, while light that passes through the light-transmitting regions is transmitted without diffusion, and when this directional light-diffusing film is mounted to the light-exiting surface of a liquid-crystal display or the like, there is an increase in the amount of undiffused light that reaches the eye, and prevention of defocusing of the display image.

18 Claims, 7 Drawing Sheets

DIRECTIONAL LIGHT-DIFFUSING FILM, A METHOD OF MANUFACTURING SAME, AND A DISPLAY DEVICE THAT USES SAME

BACKGROUND OF THE INVENTION

1. Field of the Invention

The present invention relates to a directional light-diffusing film that is mounted to a display surface of a liquid-crystal display or plasma display or the like for the purpose of preventing a reduction in frontal intensity and preventing parallax, to a method of manufacturing the above-noted directional light-diffusing film, and to a display that uses this directional light-diffusing film.

2. Description of the Related Art

In the past, in a display such as a reflective-type liquid-crystal display as noted above, a light-diffusing film was mounted for the purpose of preventing a reduction in the frontal intensity of the display screen and preventing parallax.

This light-diffusing film was, for example, a resin sheet (film) that had surface unevenness and that included a light-diffusing substance, or was a resin sheet over which a light-diffusing layer having surface unevenness and including a light-diffusing substance was provided, so as to diffuse the light exiting from the display surface.

In the above-noted types of light-diffusing films that is a resin sheet over which a light-diffusing layer having surface unevenness and including a light-diffusing substance is provided, there are film types that have extremely small surface unevenness, which mainly use the diffusion effect of internal diffusion within the light-diffusing layer.

Because a lens film also has the same type of effect as a light-diffusing film, there are cases in which it is used in the application of a light-diffusing film.

Additionally, there is a louver film that is similar to the above-noted lens film and light-diffusing film. This louver film absorbs oblique external light and has the effect of improving frontal contrast.

While the above-noted type of light-diffusing film and lens film can improve the frontal intensity and parallax by diffusion of transmitted light, the light-diffusion effect thereof increases the scattered reflections of external light, thereby causing a significant decrease in contrast, or a tendency for an image formed by pixels on the display screen to appear out of focus.

With a light-diffusing film that mainly uses internal diffusion, it is possible to reduce the reflection of external light in comparison with the usual light-diffusing film. However, with such a light-diffusing film there is an increase in the diffusion of image light, the result being the defocusing of the image is greater than with a usual light-diffusing film.

With the above noted louver film, oblique external light is absorbed, and there is the effect of improving the frontal contrast. However, because there is no effect of diffusing transmitted light, it is not possible with this type of film to achieve an improvement in intensity and parallax.

SUMMARY OF THE INVENTION

Accordingly, it is an object of the present invention, in consideration of the above-noted drawbacks in the prior art, to provide a directional light-diffusing film that can improve the image defocusing without sacrificing the function of preventing an excessive reduction in frontal intensity and preventing parallax, to provide a method for manufacturing the above-noted directional light-diffusing film, and to provide a display that uses the above-noted directional light-diffusing film.

To achieve the above-noted object, the present invention is a directional light-diffusing film that is configured with minute light-transmitting regions that pass light in the thickness direction and minute light-diffusing regions that diffuse light in the thickness direction, these regions being arranged in an alternating manner and without space therebetween in either the direction of one dimension or the directions of two dimensions, on at least one surface of the front and rear surfaces of a transparent base material film.

The above-noted light-diffusing regions can have a polygonal cross-section in a cutting direction that is perpendicular to the front surface or the rear surface.

In the above-noted directional light-diffusing film, the light-diffusing regions and the light-transmitting regions can be configured in parallel lines arranged in an alternating manner.

Additionally, the above-noted light-diffusing regions can be made by including a light-diffusing substance in a transparent resin.

It is also possible to have the border between the above-noted light-diffusing regions and light-transmitting regions be an uneven surface in which a minute depression and protrusion are formed.

In the above-noted directional light-diffusing film, it is possible to use the above-noted light-transmitting regions as either convex lenses or concave lenses.

In the above-noted directional light-diffusing film, it is additionally possible to cover the outside of the above-noted light-diffusing regions and light-transmitting regions with an anti-reflective layer.

In the above-noted directional light-diffusing film, it is also possible to further provide a light-transmitting adhesive layer on at least one surface of the front and rear surfaces.

In the above-noted directional light-diffusing film, it is also possible to laminate a polarizer onto at least one of the above-noted front surface and rear surface.

In the above-noted directional light-diffusing film, it is also possible for the above-noted polarizer to be a polarizer on a surface of a liquid-crystal display.

It is additionally possible in the above-noted directional light-diffusing film to form the light-transmitting regions using a light-transmitting resin.

In the above-noted directional light-diffusing film, it is also possible to have the light-transmitting regions be voids.

As related to a display device, the present invention achieves the above-noted object by virtue of a configuration having a display panel that displays an image by means of pixels, and a directional light-diffusing film such as described above, which is laminated onto the display surface of this display device.

In the above-noted display, it is possible to adhere the above-noted directional light-diffusing film onto the display panel via an intervening light-transmitting adhesive layer.

Additionally, in the case of the above-noted display panel being a liquid-crystal display panel, it is possible to adhere the above-noted directional light-diffusing film to the display side polarizer of the liquid-crystal display panel, via an intervening light-transmitting adhesive layer.

A method of manufacturing a directional light-diffusing film that achieves the above-noted object is one whereby a directional light-diffusing film that is configured with minute light-transmitting regions that pass light in the thickness direction and minute light-diffusing regions that diffuse light in the thickness direction, these regions being arranged in an alternating manner and without space therebetween in either the direction of one dimension or the directions of two dimensions, on at least one surface of the front and rear surfaces of a transparent base material film is manufactured, this method having a step of causing a roller die, which is formed so as to have intermittently formed in it shape-imparting depressions along its outer periphery, to rotate, while applying a fluid resin into the depression parts of a roller die, and while a transparent resin film is wound around the outside of the roller die and caused to come into contact with the resin inside the above-noted depressions, a step whereby, during rotation of the above-noted roller die, resin inside the above-noted shape-imparting depressions is caused to come into intimate contact with the transparent base material film and caused to be hardened, thereby forming either a light-diffusing region or a light-transmitting region, and a step of peeling both the hardened resin and the transparent base material film from the roller die.

In the above-noted method of manufacturing a directional light-diffusing film, after the above-noted peeling step, there can be a step of filling the between the hardened resin that forms the light-diffusing region or light-transmitting region with a resin that acts as a light-transmitting or light-diffusing region, respectively, and of causing this resin to harden.

In the present invention, because either the front surface or the rear surface of the transparent base material film is covered by minute transparent regions and light-diffusing regions in alternating arrangement, not only does the accompanying light-diffusing effect prevent a decrease in frontal intensity and parallax, but also image defocusing that is caused by an increase in the amount of non-diffused front-exiting light from a transparent region between neighboring light-diffusing region is prevented.

DESCRIPTION OF THE PREFERRED EMBODIMENTS

Embodiments of the present invention are described below in detail, with reference being made to the relevant accompanying drawings.

Figure 1:
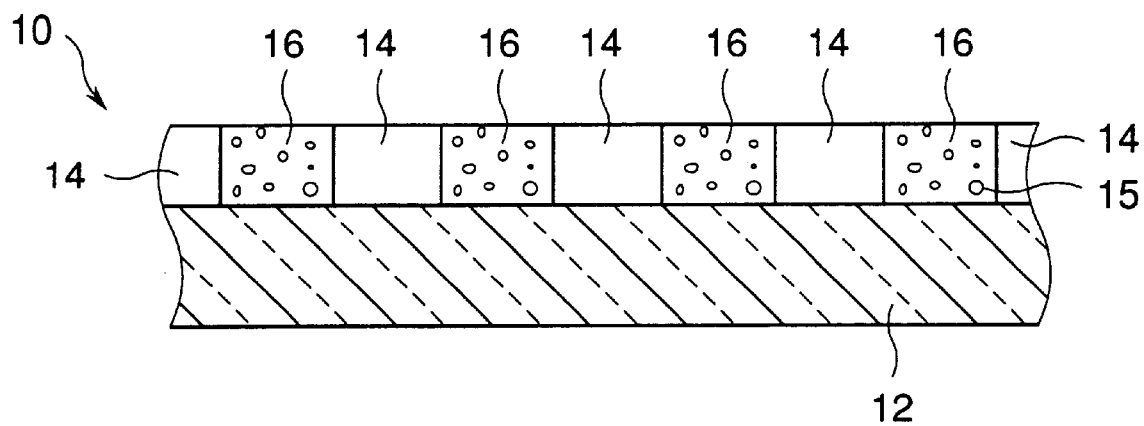
FIG. 1 is an enlarged cross-section view that shows a part of a directional light-diffusing film according to the first embodiment of the present invention.

FIG. 1 shows the first embodiment of a directional light-diffusing film 10 according to the present invention.

This directional light-diffusing film 10 is formed by minute light-transmitting regions 14 that transmit light in the thickness direction and minute light-diffusing regions 16 that diffuse light that attempts to pass in the thickness direction, these light-transmitting regions 14 and light-diffusing regions 16 being formed on the surface of a transparent base material film 12 in an alternating arrangement.

The transparent base material film 12 is made of a transparent resin film, such as polyethylene terephthalate (PET) film, the light-diffusing regions 16 are made of a UV-curable resin film that contains a light-diffusing substance 15 such as acrylic beads or the like, and the light-transmitting regions 14 are formed either by voids or by a transparent resin that can be cured by ionizing radiation.

The light-transmitting regions 14 and the light-diffusing regions 16 are arranged so as to extend in a band that is parallel to a direction that is perpendicular to the paper in FIG. 1. The dimensions of these regions, in the case of a transparent base material film 12 made of PET having a thickness of 125 $\mu$m, are a height of 50 to 150 $\mu$m in the film thickness direction of the light-transmitting regions 14 and light-diffusing regions 16 and a width of approximately 50 to 120 $\mu$m.

If a directional light-diffusing film 10 configured as described above is mounted, for example, to the display surface of a reflective-type liquid-crystal display, exiting light is diffused by the light-diffusing regions 16, so that there is a reduction in the excessive frontal intensity, and a prevention of parallax, while a light-transmitting region 14 between the light-diffusing regions 16 allows the light to pass without being diffused, thereby improving the defocusing of the displayed image.

Furthermore, by making the light-diffusing regions 16 so that they include a light-diffusing substance 15 such as acrylic beads, a light-diffusing effect is obtained. It should be noted, however, that the present invention is not restricted in this respect, and it is possible in the present invention to obtain a light-diffusing effect by a different means as well.

Figure 2:
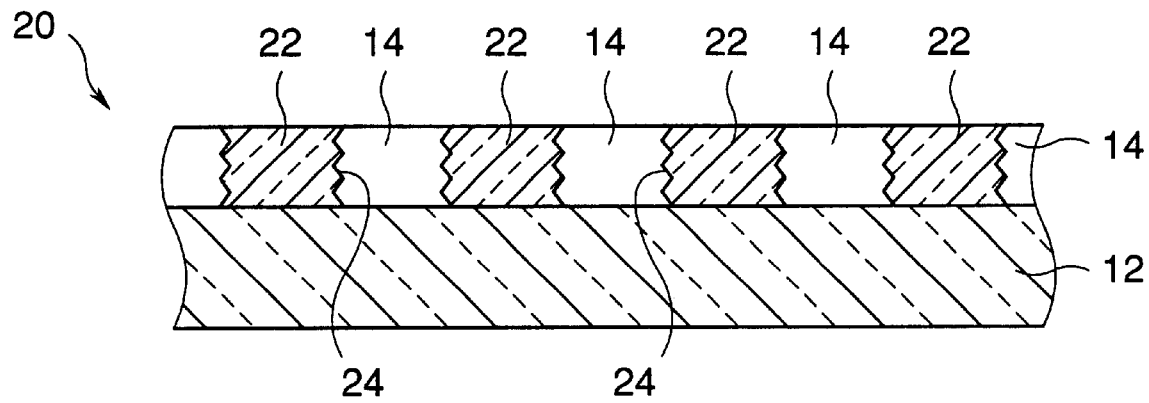
FIG. 2 is an enlarged cross-section view, similar to FIG. 1, but for a directional light-diffusing film according to the second embodiment of the present invention.

For example, as shown in the second embodiment of a directional light-diffusing film 20 according to the present invention in FIG. 2, it is possible to make the boundary surface between the light-transmitting regions 14 and light-diffusing regions 22 an uneven surface 24 with minute depression and protrusions, thereby achieving the effect of diffusing light. It is also possible to use this in combination with a light-diffusing substance.

In the directional light-diffusing film 20 of the second embodiment of the present invention as noted above, not only light that attempts to pass through the light-diffusing regions 22, but also part of the light that attempts to pass through the light-transmitting regions 14 is reflected by the above-noted uneven surface 24, thereby being diffused and, if there is no light-diffusing substance included, as long as light that passes straight through the light-diffusing regions 22 is not reflected at the uneven surface 24, it will exit as straight light.

Although in the first and second embodiments of a directional light-diffusing film 10 and 20, the light-transmitting regions 14, and the light-diffusing regions 16 and 22 are arranged in minute straight-line groups that extend in a straight line in a direction that is perpendicular to the paper surface in the drawings, it should be noted that the present invention is not restricted in this manner, and that it is sufficient to have the light-transmitting regions and light-diffusing regions arranged in an alternating manner in the direction of one dimension or the direction of two dimensions along either the front or rear surface of the transparent base material film.

Figure 3:
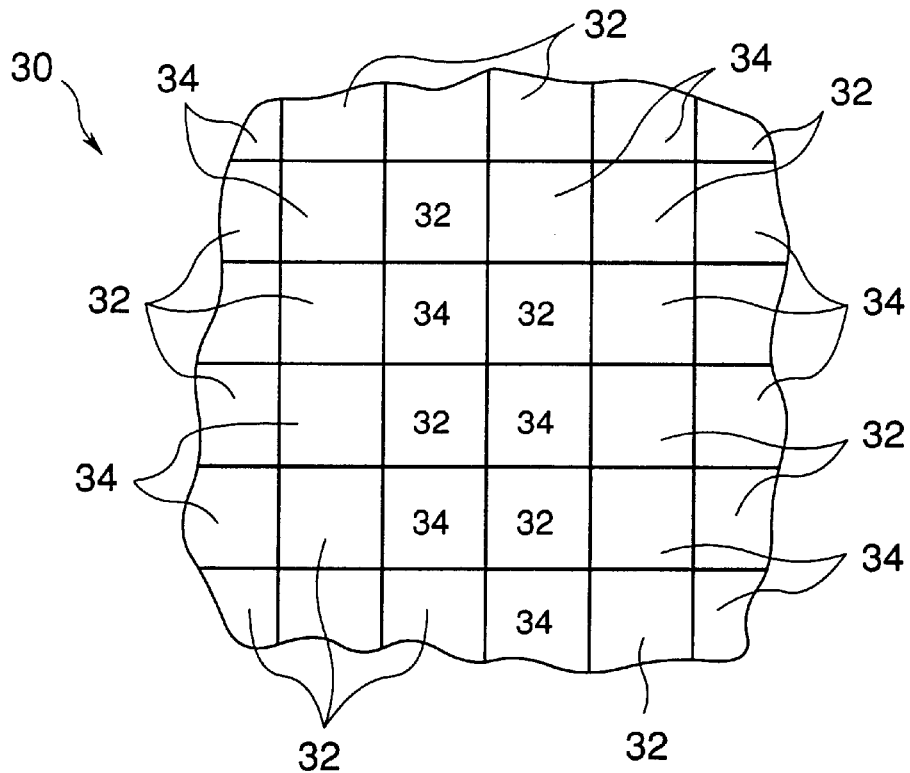
FIG. 3 is an enlarged cross-section view that shows a part of a directional light-diffusing film according to the third embodiment of the present invention.

Therefore, in the case of FIG. 3, for example, which shows the third embodiment of a directional light-diffusing film 30 according to the present invention, it is possible to have light-transmitting regions 32 and light-diffusing regions 34 arranged in an alternating checkerboard pattern on the surface of the transparent base material film 12.

Note that, while in the first to third embodiments of a directional light-diffusing film 10, 20, and 30 according to the present invention, the cross-section shapes of the light-transmitting regions 14 and 32 and the light-diffusing regions 16, 22, and 34 in a direction that is perpendicular to the front surface are all square, the present invention is not restricted in this manner, it being possible to have a different polygonal shape.

Figure 4:
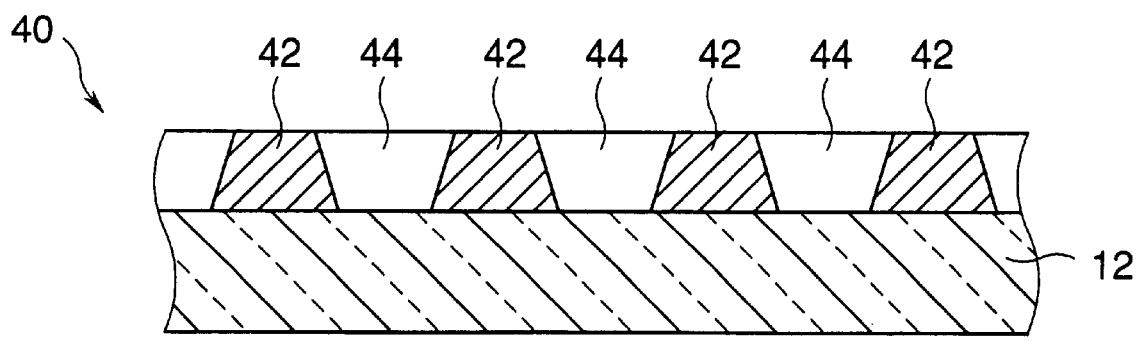
FIG. 4 is an enlarged cross-section view that shows a part of a directional light-diffusing film according to the fourth embodiment of the present invention.

For example, as shown in the fourth embodiment of a directional light-diffusing film 40 of FIG. 4, it is possible to have the cross-sectional shape of light-diffusing regions 42 be a trapezoid which has a base side on the transparent base material film 12 side that is wider than the upper side on the outside, and have light-transmitting regions 44 have a shape that is a trapezoid with the opposite orientation from the light-diffusing regions 42.

Next, a directional light-diffusing film 50 according to the fifth embodiment of the present invention will be described.

This directional light-diffusing film 50 has light-transmitting regions 52 and light-diffusing regions 54, similar to the first through the fourth embodiment, but additionally has an anti-reflective layer 56 laminated on the outside thereof.

This anti-reflective layer 56 is made of a material that takes well to a resin, such as a single layer or a hardened multilayer film of titanium oxide, zirconium oxide or silicon oxide. In the case of a multilayer structure, the general method is to alternately laminate a titanium oxide or zirconium oxide, which has a high refractive index, with a silicon oxide or the like, which as a low refractive index.

In the case in which the above-noted anti-reflective layer 56 is provided, the light-transmitting regions 52 is made of a transparent resin having the same thickness as the light-diffusing regions 54, the anti-reflective layer 56 being formed over the aligned planes of these two elements.

In this manner, if the directional light-diffusing film 50 which has the anti-reflective layer 56 is mounted to the display surface of a liquid-crystal display, because there is little reflection caused by external light, it is possible to suppress defocusing of the displayed image.

Figure 6:
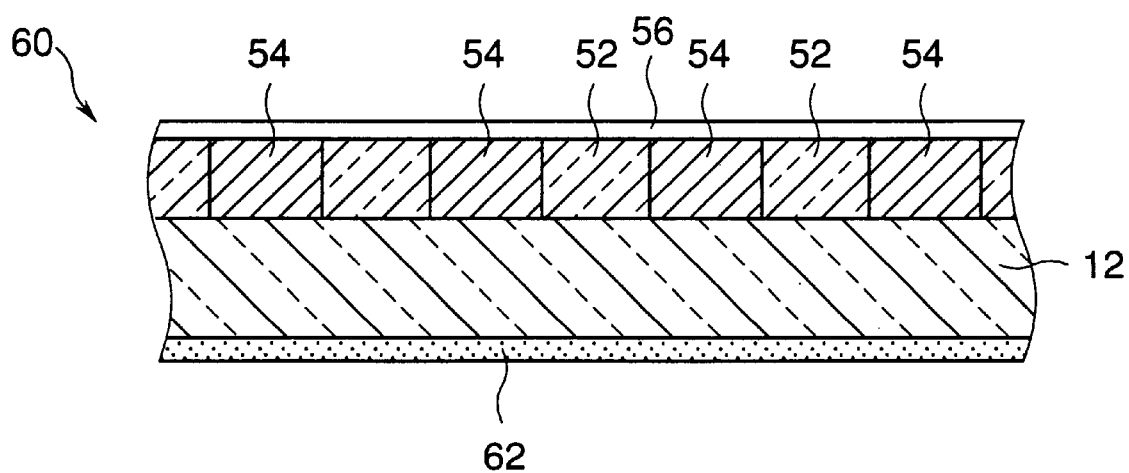
FIG. 6 is an enlarged cross-section view that shows a part of a directional light-diffusing film according to the sixth embodiment of the present invention.

Next, a directional light-diffusing film 60 according the sixth embodiment of to the present invention, as shown in FIG. 6, will be described.

Figure 5:
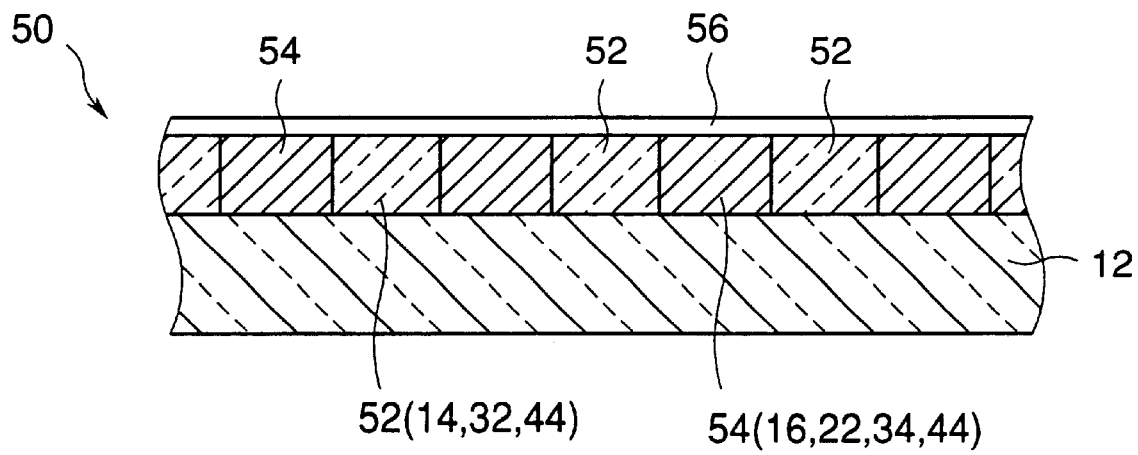
FIG. 5 is an enlarged cross-section view that shows a part of a directional light-diffusing film according to the fifth embodiment of the present invention.

This directional light-diffusing film 60 is provided with an adhesive layer 62 on the side of the transparent base material film 12 that is opposite from the light-transmitting regions 52 and light-diffusing regions 54 in the directional light-diffusing film 50 shown in FIG. 5.

This adhesive layer 62 is made from an optically transparent adhesive.

By providing this adhesive layer 62, it is easy to mount the directional light-diffusing film 60 to the display surface of a liquid-crystal display, for example.

Figure 7:
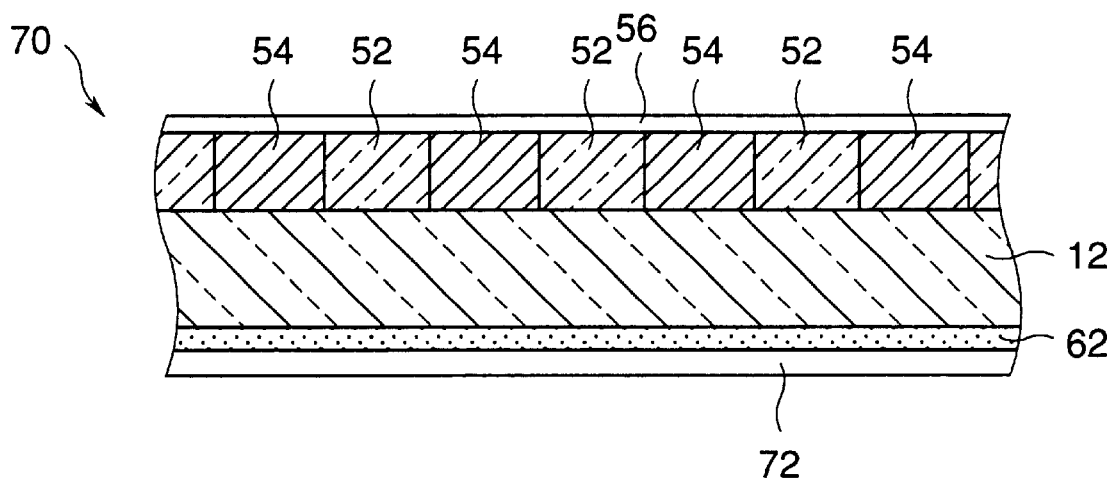
FIG. 7 is an enlarged cross-section view that shows a part of a directional light-diffusing film according to the seventh embodiment of the present invention.

Next, a directional light-diffusing film 70, shown in FIG. 7, according to the seventh embodiment of the present invention will be described.

The directional light-diffusing film 70 has the arrangement of the sixth embodiment, with the addition of a polarizer 72 that is adhered to the adhesive layer 62 in the directional light-diffusing film 60 shown in FIG. 6.

This polarizer 72 is, for example, is a dichroic polarizer made of a high polymer, such as a polyvinyl alcohol, and is usually equivalent to one of the pair of polarizers in between which a liquid-crystal element is sandwiched in a liquid-crystal panel.

By mounting the polarizer 72 of this directional light-diffusing film 70 to the liquid-crystal element, it is easy to use it as part of a liquid-crystal display.

In addition to polyethylene terephthalate, it is possible to use a polyester resin such as polypropylene terephthalate, an acrylic resin such as polymethyl metacrylate, polycarbonate resin, polystyrene resin, polymethyl pentene resin or another such material having good transparency as the transparent material for the transparent base material film 12. An oligomer such as polyester acrylate, urethane acrylate, or epoxy acrylate, and/or a resin such as an acrylate monomer that can be cured with ionizing radiation, or a resin that can either cured by electromagnetic radiation such as UV radiation or an electron beam is used as a resin for forming the light-transmitting regions 14, 32, 44 and 54. In using a resin such as this, a resin having a refractive index in the range from 1.4 to 1.6 is used.

The beads used as the above-noted light-diffusing substance 15 can be beads having a diameter of 1 to 10 $\mu$m and made of, for example, polymethyl metacrylate (acrylic) beads, polymethyl oxybutyl beads, polycarbonate beads, polyurethane beads, calcium carbonate beads, or silica beads.

The light-diffusing regions 16 are formed by dispersing a light-diffusing substance 15 using a binder resin and then solidifying the resin, the binder resin being a transparent material such as an acrylic, polyethylene, polyester, or a vinyl polymer.

Next, an embodiment of a display that uses a directional light-diffusing film 10, 20, 30, 40, 50, 60, or 70, as described above, will be described below.

Figure 8:
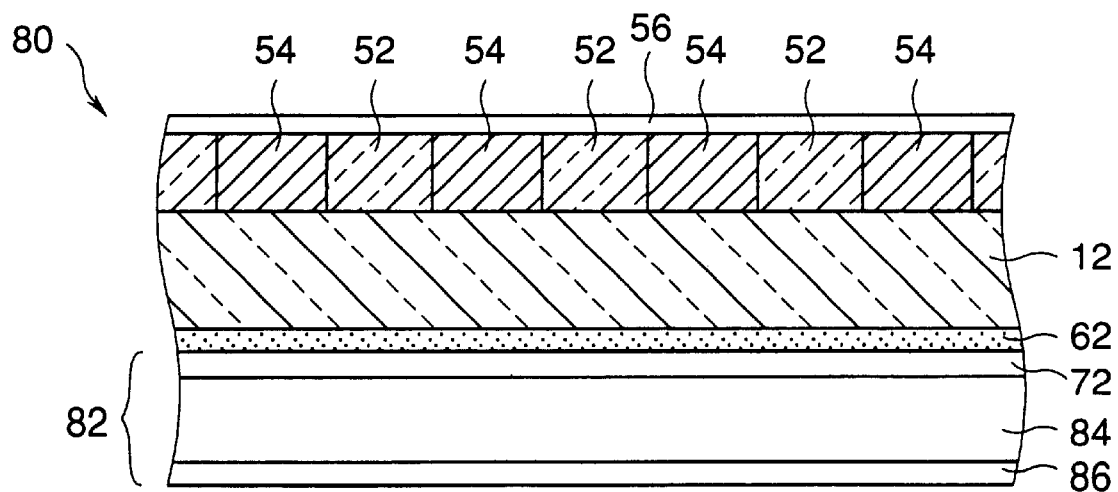
FIG. 8 is an enlarged cross-section view that shows a part of a liquid-crystal display according to the eight embodiment of the present invention for a display device.

This display 80, as shown in FIG. 8, has the directional light-diffusing film 70, for example, which includes the polarizer 72, mounted to the light-exiting side of a liquid-crystal display panel 82. In FIG. 8, the reference numeral 84 denotes a liquid-crystal element, and 86 is a polarizer which sandwiches the liquid-crystal display element 84 from the other side of the polarizer 72.

In this display 80, as described above, because light-transmitting regions 52 and light-diffusing regions 54 are alternately arranged on the surface of the directional light-diffusing film 70, the resulting diffusion prevents a reduction of frontal intensity and parallax, in addition to an increase in the amount of light that passes through the light-transmitting regions 54 without diffusion to exit from the front, thereby preventing defocusing of the displayed image.

Figure 9:
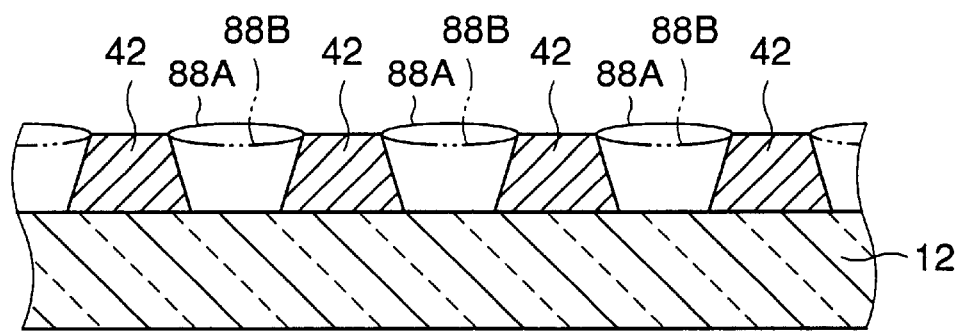
FIG. 9 is an enlarged cross-section view that shows a part of another embodiment of a transparent region in a directional light-diffusing film according to the present invention.

In any of the light-transmitting regions 14, 32, 44, and 52, although the surfaces thereof are shown as flat, there is no limitation to a flat surface on the light-transmitting regions and, for example, it is possible as shown in FIG. 9, to have the surfaces of light-transmitting regions 88A be shaped as convex lenses or, as shown by the double-dot broken lines in FIG. 9, to have the surfaces of light-transmitting regions 88B be shaped as concave lenses. Additionally, although the lens shapes shown in FIG. 9 are curves, there is no restriction to curves, and other shapes can be used.

Next, a method of manufacturing a directional light-diffusing film as described above is described below, with references being made to FIG. 10.

A directional light-diffusing film manufacturing apparatus 90 for the purpose of this manufacturing method is one in a roller die 94 is used, this roller die 94 having shape-imparting depressions 92 formed in the cross-section of its outer periphery at a uniform angular interval which correspond to the above-noted light-diffusing regions 16, 22, 34, 42 or 54, or the light-diffusing regions 14, 32, 44, or 52 the surface of the transparent base material film 12 that is wound around this roll die 94 having a resin 96 which will serve as the light-diffusing regions or the light-transmitting regions applied to it and then hardened thereon.

More specifically, into the above-noted shape-imparting-depressions 92 the liquid UV-curable resin 96 is continuously supplied (applied) by an application device 98 that is in physical contact with the roller die 94 beneath the roller die 94, the resin 96 inside the shape-imparting depressions 92 being caused to come into contact with the inside surface of the transparent base material film 12 that is wound around the roller die 94 by the input-side and output-side guide rollers 102A and 102B, and a UV lamp 100 providing a prescribed amount of UV illumination onto the UV-curable resin 96 inside the shape-imparting depressions 92 via the transparent base material film 12 so as to harden the resin 96 and fix it onto the transparent base material film 12.

With the resin 96 affixed to the transparent base material film 12, as the transparent base material film 12 is separated from the roller die 94 along the output-side guide roller 102B, the hardened resin 96 is pulled away from the shape-imparting depressions 92 of the roller die 94.

Then, if necessary, filling in the space between the resins 96, 96 is done by a resin that forms a light-transmitting region or light-diffusing region and, if further necessary, as described above the anti-reflective layer 56 and adhesive layer 62 or polarizer 72 is laminated thereonto.

According to the above-described method of manufacture, it is possible to continuously and at a low cost fabricate a directional light-diffusing film.

In the case in which, as shown in FIG. 3, the light-transmitting regions and light-diffusing regions are arranged in the directions of two dimensions, the shape-imparting depressions 92 are also arranged on the roller die 92 in two directions, the axial direction and the circumferential direction.

Various examples of the present invention are compared below with some comparison examples.

Figure 10:
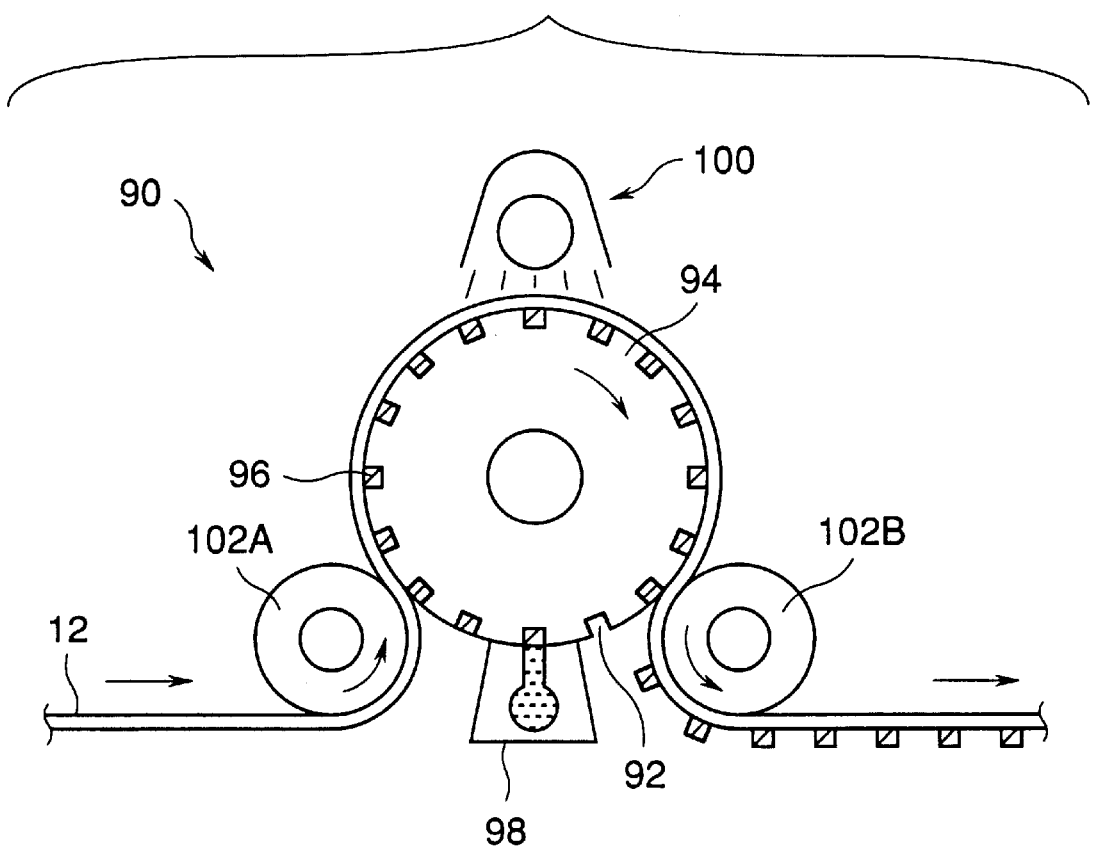
FIG. 10 is a simplified cross-section view that shows manufacturing processes for the above-noted directional light-diffusing film.

Examples 1 through 4 all use Toyobo type A4300 PET film as the transparent base material film, Soken Kagaku type MX-500H acrylic beads as the light-diffusing substance, this being mixed at 20 g/liter with Dai Nippon Ink type RC17-236 UV-curable resin, light-diffusing regions being formed by the method of manufacturing a directional light-diffusing film according to the present invention, as shown in FIG. 10. Rather than using a resin, a void (air) was used as the light-transmitting regions.

In example 5, the light-diffusing regions were formed in the same manner as in example 1, and the void light-transmitting regions were filled with Dai Nippon Ink type RC17-236 and then this resin was cured by UV, thereby obtaining a directional light-diffusing film which has light-transmitting regions made of resin.

Figure 12:
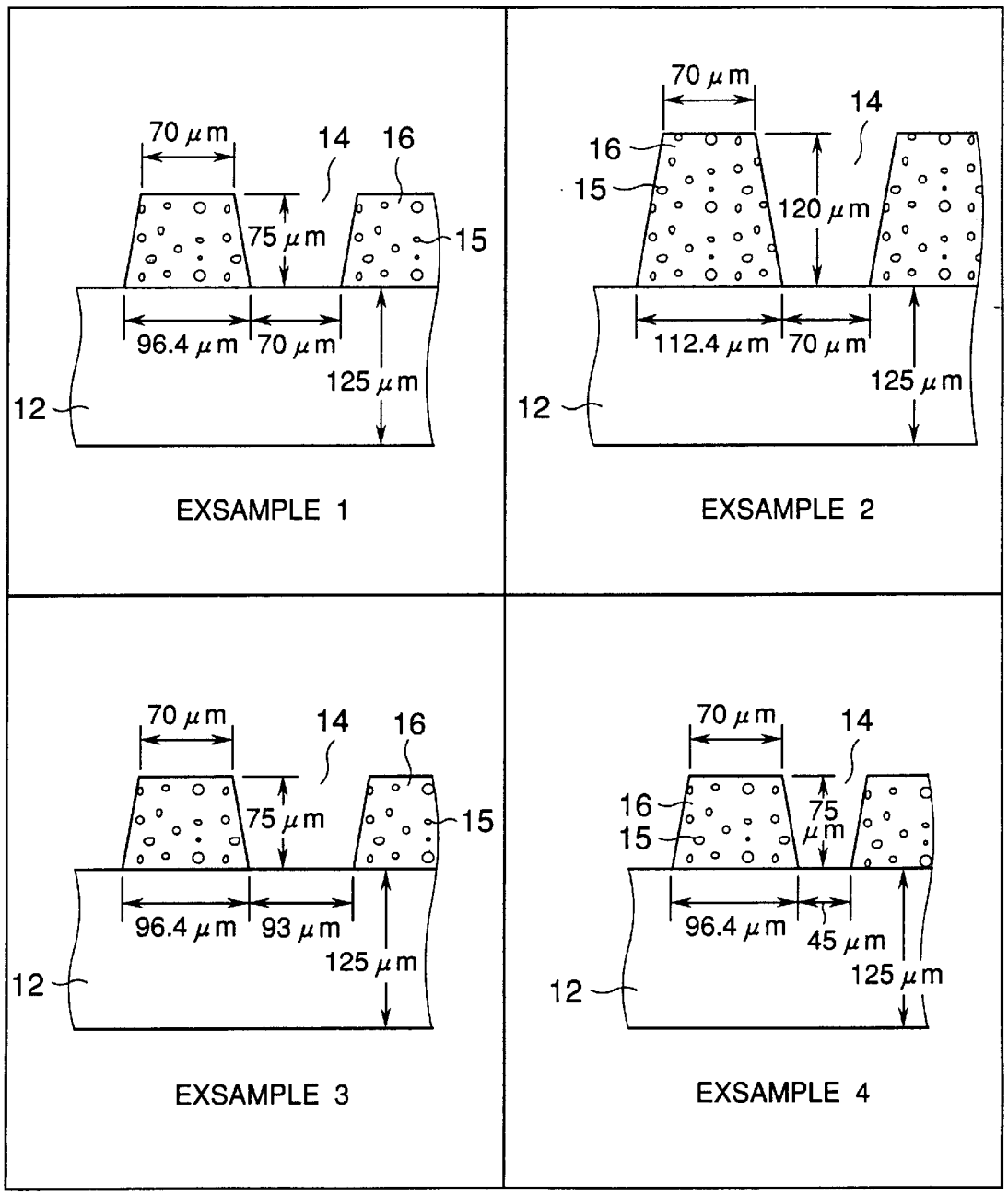
FIG. 12 is a cross-section view that shows an enlarged view of the directional light-diffusing film in the above-noted examples.

The physical property values were adjusted as indicated by the Hayes values and full-ray transmissivities as shown in Table 1, and four types of directional light-diffusing film were made, having the cross-sectional shapes and dimensions as shown in FIG. 12. With regard to the comparison examples 1 to 3 as well, materials such as noted for examples 1 through 5 were used, except that light-transmitting regions were not provided, and the UV-curable resin that included a light-diffusing substance was applied and hardened so that the applied thickness on the transparent base material film after curing was 20 μm.

TABLE 1

Directional Light-Diffusing Film Physical Properties

| | Base material incidence | | Diffusion layer incidence | |
|---|---|---|---|---|
| | Hayes value | Full-ray transmissivity (%) | Hayes Value | Full-ray transmissivity (%) |
| Samples | | | | |
| 1 | 26.5 | 92.0 | 24.1 | 89.1 |
| 2 | 35.4 | 92.4 | 32.5 | 88.1 |
| 3 | 22.5 | 90.9 | 21.4 | 89.6 |
| 4 | 30.5 | 92.1 | 28.5 | 89.0 |
| 5 | 15.5 | 94.2 | 14.7 | 92.7 |
| Comparison Samples | | | | |
| 1 | 88.2 | 73.2 | 89.5 | 99.9 |
| 2 | 88.5 | 72.4 | 89.8 | 100.0 |
| 3 | 90.1 | 74.0 | 90.9 | 98.9 |

Figure 11:
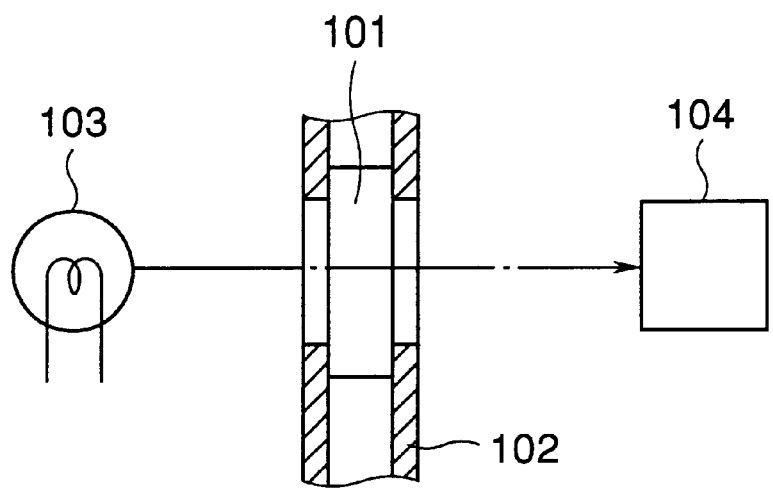
FIG. 11 is an optical arrangement drawing that shows the method of measuring the Hayes value and the full-ray transmissivity of examples of the directional light-diffusing film according to the present invention and a comparison example.
Figure 13:
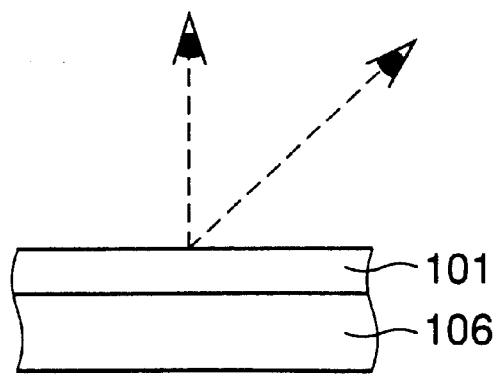
FIG. 13 is a cross-section view that shows the process of verifying display light in the above-noted examples and a comparison example.

The Hayes values were measured using a Toyo Seiki Hayes Meter, with the measurement setup as shown in FIG. 11, the present invention embodiment sample or comparison sample film 101 being held in a fixture 102 and a light source 103 being used to light the film from the front direction, transmitting light in the frontal direction being measured by a light pickup 104, and the full-ray transmissivity being simultaneously measured.

These were mounted onto the screen 106 of a Sharp PI-6500 electronic diary to verify the visual effect, the results being as shown in Table 2.

TABLE 2

Effect When Mounted

| | Evaluation of the effect with respect to frontal defocusing | Diffusion at 30° inclination (Hayes value) | Evaluation of diffusion effect at 30° inclination |
|---|---|---|---|
| Samples | | | |
| 1 | Effect | 31.3 | Some effect |
| 2 | Some effect | 43.8 | Effect |
| 3 | Effect | 25.0 | Some effect |
| 4 | Effect | 38.8 | Some effect |
| 5 | Effect | 20.2 | Some effect |
| Comparison samples | | | |
| 1 | Little effect | 88.2 | Effect |
| 2 | Little effect | 88.5 | Effect |
| 3 | Little effect | 90.1 | Effect |

As shown in Table 2 also, compared with the comparison samples, any one of the present invention samples 1 through 5 showed a considerable improvement in defocusing of the displayed image. There was also a smaller reduction in the light-diffusing effect.

In addition, upon providing an anti-reflective layer to the directional light-diffusing films of samples 1 to 4, the corresponding reflectivities were as shown in Table 3.

TABLE 3

Samples Provided With an Anti-reflective Layer

| Samples | Reflectivity (%) |
|---|---|
| 1 | 1.02 |
| 2 | 0.98 |
| 3 | 1.00 |
| 4 | 1.10 |

What is claimed is:

1. A directional light-diffusing film, comprising:
   a tansparent base material film;
   a plurality of minute light-transmitting regions that are directly formed on a surface of the transparent base material film and pass light in a thickness direction of the transparent base material film; and
   a plurality of minute light-diffising regions that are directly formed on the surface of the transparent base material film and diffuse light in the thickness direction, said light-transmitting regions and said light-diffusing regions being arranged in an alternating manner without space therebetween along at least one side of said transparent base material film, said light-transmitting regions being formed of a light-transmitting resin, and a boundary surface being between each adjacent light-transmitting region and light-diffusing region.

2. A directional light-diffusing film according to claim 1, wherein said light-diffusing regions have a polygonal cross-section in a cutting direction that is perpendicular to said transparent base material.

3. A directional light-diffusing film according to claim 1, wherein said light-diffusing regions and said light-transmitting regions are configured in parallel lines arranged in an alternating manner.

4. A directional light-diffusing film according to claim 1, wherein said light-diffusing regions is made by including a light-diffusing substance in a transparent resin.

5. A directional light-diffusing film according to claim 1, wherein the boundary surfaces between said light-diffusing regions and said light-transmitting regions are uneven surfaces in which minute depressions and protrusions are formed.

6. A directional light-diffusing film according to claim 1, wherein a surface of each said light-transmitting region is used as either a convex lens or a concave lens, while a surface of each said light-diffusing region is flat.

7. A directional light-diffusing film according to claim 1, further comprising an anti-reflective layer which covers a top surface of each of said light-diffusing regions and said light-transmitting regions.

8. A directional light-diffusing film according to claim 1, further comprising a light-transmitting adhesive layer positioned on one side of the transparent resin material film.

9. A directional light-diffusing film according to claim 1, further comprising a polarizer positioned on one side of the transparent base material.

10. A directional light-diffusing film according to claim 9, wherein said polarizer is a polarizer on a front surface of a liquid-crystal display.

11. A directional light diffusing film according to claim 1, wherein the boundary surface extends through an entire thickness of the light-diffusing regions and the light-transmitting regions.

12. A display device comprising;
   a display panel that displays an image; and
   a directional light-diffusing film positioned on a display surface of the display device, said directional light-diffusing film comprising:
      a transparent base material film,
      a plurality of minute light-transmitting regions that are directly formed on a surface of the transparent base material film and pass light in a thickness direction of the transparent base material film,
      a plurality of minute light-diffusing regions that are directly formed on the surface of the transparent base material film and diffuse light in the thickness direction, said light-transmitting regions and said light-diffusing regions being arranged in an alternating manner without space therebetween along at least one side of said transparent base material film, said light-transmitting regions being formed of a light-transmitting resin, and a boundary surface being between each adjacent light-transmitting region and light-diffusing region.

13. A display device according to claim 12, wherein the light-diffusing regions comprise a resin that contains a light-diffusing substance.

14. A display device according to claim 12, wherein the boundary surface extends through an entire thickness of the light-diffusing regions and the light-transmitting regions.

15. A method of manufacturing a directional light-diffusing film comprising the steps of:
   feeding a transparent base material film;
   rotating a roller die having intermittently formed shape-imparting depressions along an outer periphery thereof, while applying a fluid first resin into the depressions of the roller die;
   winding the transparent base material film around the outer periphery of the roller die so as to come into contact with the first resin in the depressions;
   hardening the first resin, thereby directly forming one of light-diffusing regions and light-transmitting regions on a surface of the transparent base material film;

peeling both the hardened first resin and the transparent base material film from the roller die; and filling spaces between the hardened first resin that forms the one of light-diffusing regions and light transmitting regions by directly forming a second resin that forms another one of light-diffusing regions and light transmitting on the surface of the transparent base material film.

16. A method of manufacturing a directional light-diffusing film according to claim 15, wherein the light-diffusing regions comprise a resin that contains a light-diffusing substance.

17. A directional light-diffusing film, comprising:

a transparent base material film;

a plurality of minute light-transmitting regions that pass light in a thickness direction of the transparent base material film; and a plurality of minute light-diffusing regions that diffuse light in the thickness direction, said light-transmitting regions and said light-diffusing regions being arranged in an alternating manner without space therebetween along at least one side of said transparent base material film, said light-transmitting regions being formed of a light-transmitting resin, and a boundary surface being between each adjacent light-transmitting region and light-diffusing region and extending through an entire thickness of the light-diffusing regions and the light-transmitting regions, wherein a top surface of the light-diffusing regions is level with a top surface of the light-transmitting regions.

18. A directional light-diffusing film according to claim 17, wherein the light-diffusing regions comprise a resin that contains a light-diffusing substance.

* * * * *